(12) United States Patent
Patel et al.

(10) Patent No.: US 6,611,900 B2
(45) Date of Patent: *Aug. 26, 2003

(54) SYSTEM AND METHOD FOR HIGH PERFORMANCE EXECUTION OF LOCKED MEMORY INSTRUCTIONS IN A SYSTEM WITH DISTRIBUTED MEMORY AND A RESTRICTIVE MEMORY MODEL

(75) Inventors: Rajesh Patel, Austin, TX (US); Bryan D. Boatright, Austin, TX (US); Larry Edward Thatcher, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/231,087

(22) Filed: Aug. 30, 2002

(65) Prior Publication Data

US 2002/0199067 A1 Dec. 26, 2002

Related U.S. Application Data

(63) Continuation of application No. 09/750,133, filed on Dec. 29, 2000, now Pat. No. 6,463,511.

(51) Int. Cl.[7] .......................... G06F 12/00; G06F 12/14; G06F 12/16; G06F 13/28
(52) U.S. Cl. .................. 711/145; 711/145; 711/146
(58) Field of Search ................................ 711/145, 146

(56) References Cited

U.S. PATENT DOCUMENTS 5,530,835 A * 6/1996 Vashi et al.
6,334,173 B1 * 12/2001 Won et al. ................ 711/156

* cited by examiner

Primary Examiner—Jack A. Lane
(74) Attorney, Agent, or Firm—Kenyon & Kenyon

(57) ABSTRACT

The present invention relates to locked memory instructions, and more specifically to a system and method for the high performance execution of locked memory instructions in a system with distributed memory and a restrictive memory model. In accordance with an embodiment of the present invention, a method for executing locked-memory instructions includes decoding a locked-memory instruction, obtaining exclusive ownership of a cacheline to be used by a load-lock operation, setting a bit to indicate the load-lock operation's ownership of the cacheline, and activating a snoop checking process. The method also includes modifying a load data value and storing the modified load data value. The method further includes determining that the cacheline is still exclusively owned, storing the load data value, determining that the cacheline is unsnooped, merging the modified load data value with the load data value, and releasing the locked-memory instruction to be retired.

20 Claims, 4 Drawing Sheets

SYSTEM AND METHOD FOR HIGH PERFORMANCE EXECUTION OF LOCKED MEMORY INSTRUCTIONS IN A SYSTEM WITH DISTRIBUTED MEMORY AND A RESTRICTIVE MEMORY MODEL

CROSS REFERENCE TO RELATED APPLICATIONS

This application is a continuation of application Ser. No. 09/750,133 filed Dec. 29, 2000, now U.S. Pat. No. 6,463,511 B1, which is incorporated herein in its entirety by reference thereto.

FIELD OF THE INVENTION

The present invention relates to locked memory instructions, and more specifically to a system and method for the high performance execution of locked memory instructions in a system with distributed memory and a restrictive memory model.

BACKGROUND

Most instruction set architectures (ISAs) provide some mechanism to perform an atomic (locked) read-modify-write sequence which guarantees that one process has exclusive access to a memory location when there are other processes that may also be contending for access to that location. Some ISAs, for example, Intel® Architecture 32-bit ISA (IA-32) from Intel Corporation of Santa Clara, Calif., can place additional restrictions on these locked-memory instructions which give the instructions memory barrier semantics. The use of memory barrier semantics creates a more restrictive memory model. This means that memory instructions younger than the locked-memory instruction cannot become visible before the locked-memory instruction safely completes execution and retires to update the architectural state of the machine. Processor chip manufacturers have generally implemented this effect by delaying execution of the locked memory instruction until it becomes the oldest, non-speculative instruction in the execution window. This delay, which also affects all instructions younger than the locked-memory instruction, can be costly to system performance. Furthermore, as modem processors continue to extend the size of instruction execution windows, the effect of this delay becomes increasingly costly to system performance. Therefore, it is desirable to replace this outdated locked-memory instruction execution paradigm with one that does not impose this delay.

Numerous processors have implemented locked-memory instructions. Some ISAs specify memory models that are so weak that a high performance implementation of the locked-memory instructions falls out as a natural consequence of the weak memory model. IA-32, however, specifies a much more restrictive memory model for locked-memory instructions, and, as a result, it is difficult to implement a high performance solution.

Prior processors have implemented locked-memory instructions in a manner that serializes their execution. For example, in Intel's Pentium® III, the following algorithm for locked-memory instructions was implemented:

1. When the locked memory instruction is detected, stop issuing instructions.
2. When all instructions older than the locked-memory instruction have completed execution, wait for all outstanding store operations to become globally observed.
3. Execute the locked-memory instruction.
4. Continue program execution.

The Pentium® III micro architecture refers to this sequences as "at-retirement execution." While this implementation can easily achieve the correct result for locked-memory instruction execution, the implementation can reduce performance because it can cause many of the resources available in a modem super-scalar, out-of-order execution processor to be under-utilized when a locked-memory instruction is decoded in the program flow.

DETAILED DESCRIPTION

Figure 1:
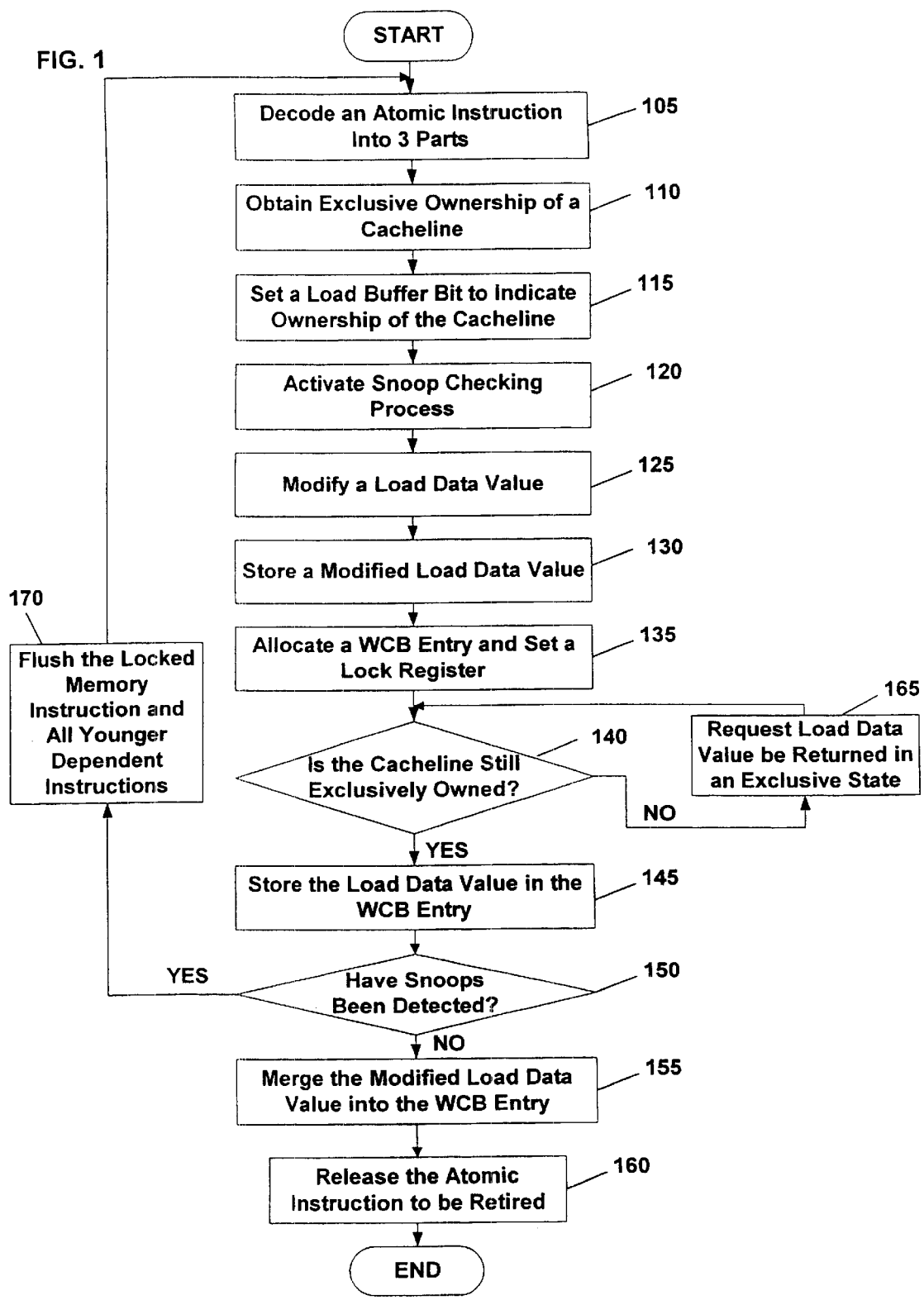
FIG. 1 illustrates a method for executing locked-memory instructions, in accordance with an embodiment of the present invention.

In accordance with an embodiment of the present invention, the system and method, like other implementations, decompose the execution of locked-memory instructions into three phases: the load-lock phase, the modify phase and the store-unlock phase. The modify phase, while generally not relevant to the scope of this invention, can include one of several simple arithmetical operations such as increment-by-one and/or decrement-by-one.

While this invention is described mainly in the context of a specific embodiment, this is not the only implementation possible. The embodiment described herein is for a processor micro architecture that has a write-through first-level (L1) data cache, a write-back second-level (L2) cache and a write-combining buffer (WCB). The processor also has a load buffer, a store buffer and a Pause Queue, which can be used to buffer data between the store buffer and the WCB. The processor groups instructions into packets and packets may only retire, that is, become part of the architectural state, when all operations in the packet are complete.

Load-lock Phase (General Case)

In accordance with an embodiment of the present invention, the locked instruction can be completely contained within one packet which implies that the load-lock operation cannot retire until the store-unlock is also ready to retire. The benefit of this approach is that the load-lock can "complete" but still have its results discarded at a later stage of the algorithm, if necessary. Note that, in other embodiments, it is not a requirement that the locked-memory instruction be contained within a single packet. However, containing the locked-memory instruction in a single packet simply makes it easier to prevent the retirement of the load-lock operation before all parts of the locked-memory instruction are known to have completed successfully.

In accordance with an embodiment of the present invention, the load-lock operations may execute speculatively and out-of-order much like normal load operations, which can substantially improve the performance of the locked-memory instruction and the instructions that follow it in the program flow. The following sequence describes, in general, the life of a load-lock operation:

1) The load-lock issues and executes like a normal load operation except that a load-lock, generally, does not take its data from a hit in the L1 cache or an older non-GO (globally observed) store operation in the store buffer. Because, in this embodiment of the present invention, the L1 cache does not contain this information about whether a cacheline is exclusively owned by the processor (which is a requirement for locked instructions) the load-lock must be serviced directly from the L2 cache which does maintain full a Modified, Exclusive, Shared, Invalid (MESI) cache protocol state. To eliminate the penalty from a translation look-aside buffer (TLB) miss that might occur when the store-unlock operation undergoes address translation, the physical address of the load-lock operation is also written to the corresponding store buffer entry thus removing the need for the store-unlock operation to undergo address translation. In alternate embodiments of the present invention, the data could be taken from the L1 cache, or other memory structure, provided the information about the cacheline's exclusivity could be ascertained either directly or indirectly from the L1 cache or other memory structure.

2) If the load-lock hits an exclusive line in the L2 cache or a GO line in the WCB, the L2 cache controller (L2CC) returns the data to a Memory Execution Cluster (MEC). If the load-lock does not hit an exclusive line, the L2 cache controller generates the required coherent system interconnect traffic and returns the data to the MEC when exclusive ownership is obtained. Whether the load-lock hits or misses in the L2 on the first attempt is hidden from the MEC which simply sees a variable load latency as it does for normal L2 accesses.

3) When the MEC returns data for the load-lock to its dependent operations (the modify phase), the MEC load buffer begins tracking whether any system snoop or self-snoop from any of the other processors (due to a read-to-share or a read-to-own) hits against this load buffer entry. A snoop hit on a load-lock operation eventually causes a flush thus discarding the result of the load-lock operation and subsequent computations that are dependent on the load-lock operation. Flushing these results is necessary because, by definition, an atomic operation acts as a memory barrier and must execute without any other processor reading or writing the contents of the target location while the processor executes the atomic sequence. Since the target cacheline is owned (that is, in an exclusive state) by the processor, the processor is guaranteed to see all other processors' attempts to read and write that cacheline.

4) Assuming that no other processor snoops the load-lock operation, the locked instruction is ready to begin its final phase of execution: the store-unlock operation.

Store-Unlock Operation

A store-unlock operation executes (that is, calculates its address) speculatively, but completes (that is, commits its data value to the state of the machine) in program order when it is the oldest store operation in the MEC store buffer (this implies that all committed stores have already been drained to the WCB and that all store buffers in the WCB are GO). Before the store-unlock begins execution, the retirement logic must also agree that the store-unlock operation is non-speculative and exception free. When these conditions are met, the store-unlock operation can begin the following, general, sequence of events in order to successfully complete the locked instruction:

1) The store-unlock operation is sent to the Pause Queue which captures the store address and data but does not yet pass it along to the WCB. Note that the store-unlock is not marked as "complete" in the processor's reorder buffer.

2) The store-unlock operation attempts to allocate a WCB entry by accessing the L2 cache just as a normal WCB merge-and-GO operation does. System snoops that match the cacheline address, which is also the target of the store-unlock operation, are delayed. The address of the store-unlock operation is stored in the Lock Register until the store-unlock operation completes (success) or is flushed (failure).

3) If successful (that is, an L2 hit on an E or M line), the coherent and exclusive cacheline now resides in the WCB and system snoop processing remains paused. If unsuccessful (that is, an L2 miss or a hit on a shared cacheline), system snoop processing resumes, and the L2 cache controller acquires exclusive ownership of the line before continuing.

4) At the time exclusive ownership of the line is obtained, the L2 cache controller examines the state of a control signal from the MEC that indicates whether the load-lock associated with the current store-unlock has been snooped. In general, this is accomplished using a simple circuit as the circuit is always looking at the oldest load-lock operation because the oldest store-unlock operation will always be associated with the oldest load-lock operation. It is also possible to examine this signal earlier (that is, in 3 above) such that if the signal is asserted and the store-unlock operation misses in the L2 cache, the locked-memory instruction is presumed to have failed and is flushed and re-executed.

5) If this signal indicates that the load-lock has not been snooped, then the store-unlock data can be moved from the WCB Pause Queue into the WCB entry allocated by the store-unlock operation. The store-unlock data is now part of the architectural state of the system. The MEC can be signaled that the L2 cache controller has completed the store-unlock successfully, and the MEC can signal the retirement logic that the store-unlock operation is complete. If, however, the signal from the MEC load buffer indicates that the load-lock has been snooped, the L2 cache controller can discard the store data from the WCB Pause Queue and signal the MEC that it is safe to flush and re-execute the locked memory instruction. In both cases, system snoop processing resumes after the MEC is signaled that the locked instruction has completed or failed.

There can be concern when system snoop processing is delayed. It is desirable to delay the processing of system snoop operations that hit the cacheline targeted by the locked instruction to cover over a number of possible windows in which the L2 cache controller and the MEC load buffer snoop-detection logic could fall out of synchronization. Snoop processing, therefore, stops at a certain point to ensure that a locked instruction can complete once the locked instruction reaches a critical point in its processing. Not only is this important for easy implementation of the invention, but it is also a key part of the guaranteed forward progress mechanism described below.

The locked instruction critical point is actually a sequence of three events. These three events include when 1) the WCB entry is allocated in an exclusive state, 2) the MEC load buffer is checked to see if a snoop recently killed the load-lock, and 3) the cacheline in the WCB is updated with the store data. It should be noted that there is a relatively short period of time between the beginning and end of this critical sequence. Most importantly, however, it should be noted that no event can prevent the completion of this critical sequence. In other words, once the critical sequence starts with the successful allocation of the WCB entry, the sequence does not need to arbitrate for any resources, internal or external. Therefore, it is safe to delay processing of system snoops while this critical sequence completes as there is no opportunity for deadlock since all necessary resources are owned before the critical sequence begins.

FIG. 1 illustrates a method for executing locked-memory instructions, in accordance with an embodiment of the present invention. In FIG. 1, an atomic instruction can be decoded 105, generally, into three parts, a load-lock phase, a modify phase, and a store-unlock phase. In the load-lock phase, exclusive ownership of a cacheline can be obtained 110 by making a local copy of the cacheline, which can be referred to as a load data value, to be used during the execution of the atomic instruction; a load buffer bit can be set 115 to indicate that the atomic instruction owns, that is, is currently in control of the cacheline; and a snoop checking process can be activated 120. In an embodiment of the present invention, the local copy of the cacheline can be stored in the L2 cache. In addition, the bit that is set can be associated with a load buffer entry that tracks the load-lock operation that references the obtained cacheline.

In FIG. 1, in accordance with an embodiment of the present invention, in the modify phase, the local copy of the cacheline data (the load data value) can be modified 125. In general, the load data value is modified, however, it is not necessary that the load data value actually be modified. Therefore, for the sake of clarity, hereinafter the load data value resulting from the modify operation will be referred to as the "modified load data value," regardless of whether the load data value is modified or not. Similarly, the original value of the local copy of the cacheline data will continue to be referred to as the "load data value."

In FIG. 1, in the store-unlock phase, the modified load data value, regardless of whether it is modified or unmodified, can be stored 130. In an embodiment of the present invention, the modified load data value can be stored 130 in a pause queue. In addition, a WCB entry can be allocated 135, and a lock register value can be set with a cacheline address of the store-unlock operation. In an embodiment of the present invention, all snoops that match the cacheline address that is the target of the store-unlock operation can be delayed. A check can be made to determine 140 if the cacheline is still exclusively owned by the atomic instruction. In an embodiment of the present invention, in which the MESI protocol is used, the cacheline will still be exclusively owned if the L2 cacheline state associated with the load buffer entry is either an "E," which indicates that the cacheline is exclusive and unmodified, or a "M," which indicates that the cacheline is modified and exclusive. If the cacheline is no longer exclusively owned, then, the original value of the local copy of the cacheline data can be requested 165 to be returned in the exclusive state and the check can be re-done to determine 140 if the cacheline is still exclusively owned by the atomic instruction. If the cacheline is still exclusively owned, then, the load data value can be stored 145 in the WCB entry. A check can be made of the bit in the load buffer entry, which is storing the cacheline, to determine 150 if any other processor and/or process snoops of the load-lock operation associated with the current store-unlock operation have been detected. If it is determined 150 that snoops were detected, then, the locked-memory instruction and all younger dependent instructions (that is, subsequently executing instructions that depend on the locked-memory instruction) can be flushed 170 from the system, and the method re-started by again decoding 105 the atomic instruction. If it is determined 150 that no snoops were detected, then, the modified load data value can be merged 155 with the WCB entry. The atomic instruction can be released 150 so the instruction can be retired and committed to the architectural state.

Figure 2:
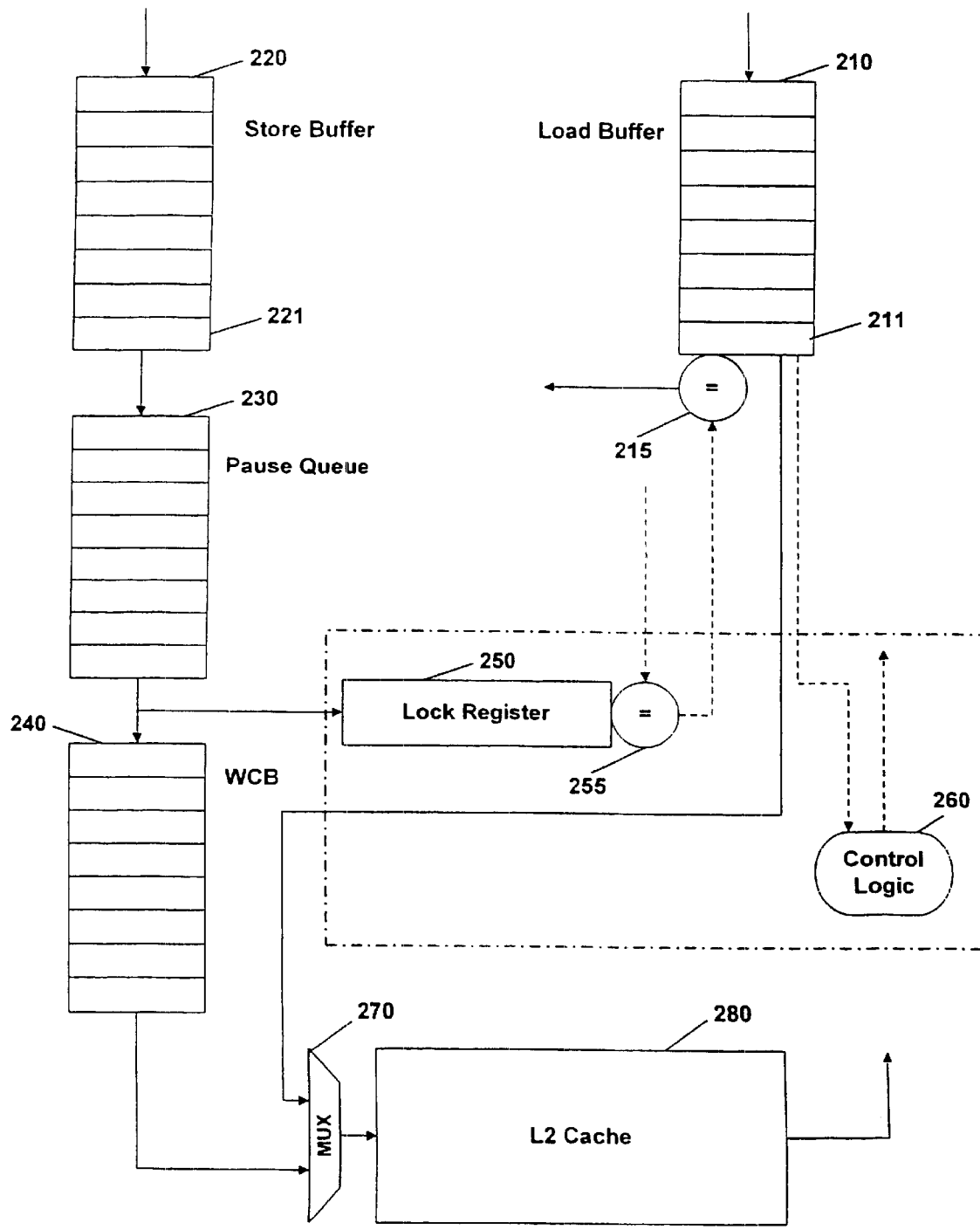
FIG. 2 is a schematic block diagram of a processor in which the method for executing locked-memory instructions can be implemented, in accordance with an embodiment of the present invention.

FIG. 2 is a schematic block diagram of a processor in which the method for executing locked-memory instructions can be implemented, in accordance with an embodiment of the present invention. In FIG. 2, a load buffer 210, which can be configured to receive and queue load-lock operations, can be coupled to a load buffer comparator 215, a control logic 260, and a multiplexer 270. A store buffer 220, which can be configured to receive and queue store-unlock operations, can be coupled to a pause queue 230, which can be coupled to a WCB 240 and a lock register 250. The WCB 240 can be coupled to the multiplexer 270 and the lock register 250 can be coupled to a lock register comparator 255. The lock register comparator 255, which can be configured to receive system snoop operations, can be coupled to the load buffer comparator 215. The multiplexer 270 can be coupled to an L2 cache 280, and the L2 cache 280 can be coupled to the load buffer 210 and to an L1 cache (not shown).

In another embodiment of the present invention, the pause queue 230 can be implemented as a single register or an equivalent memory structure or variable.

Figure 3:
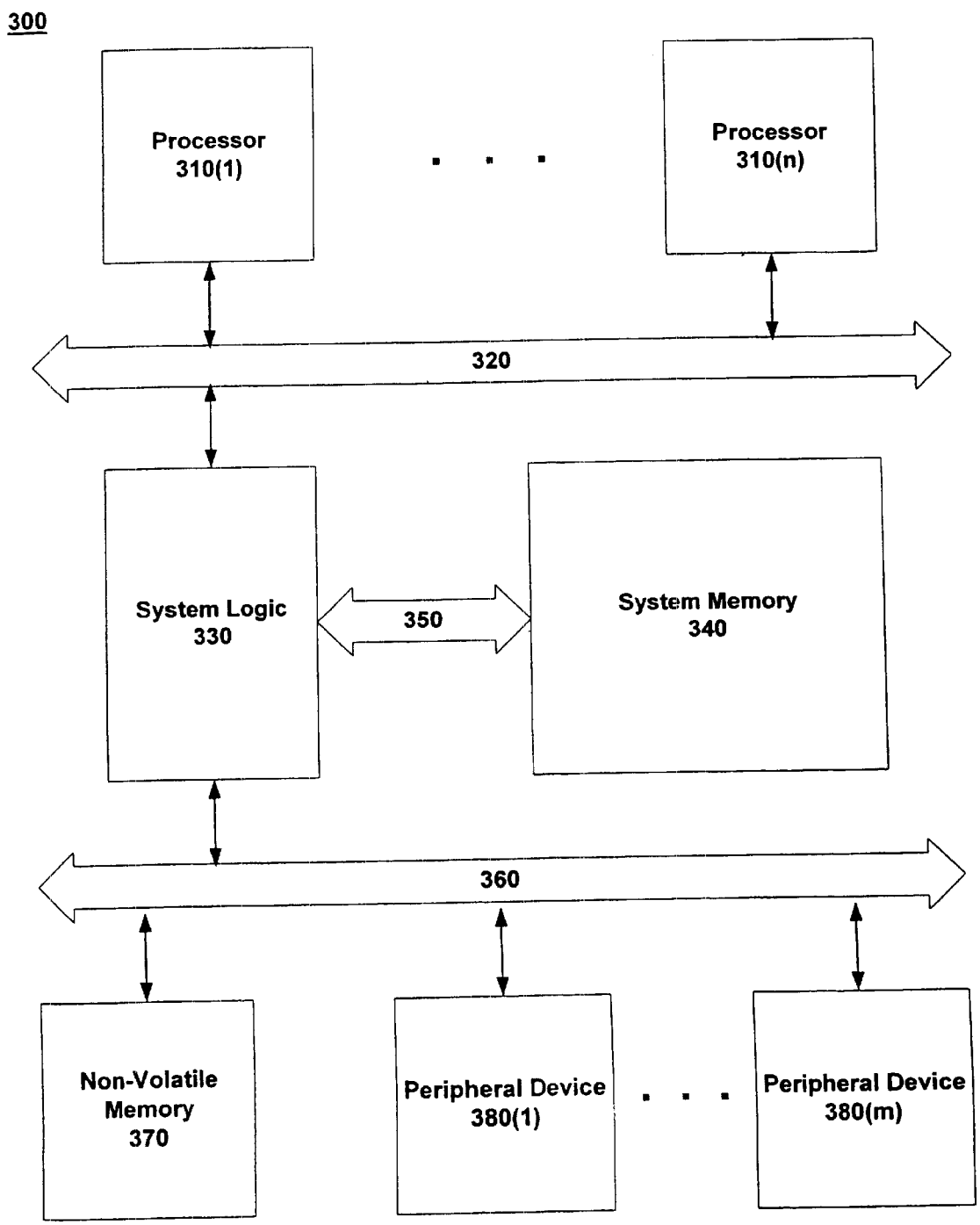
FIG. 3 is a block diagram of a computer system in which multiple store buffer forwarding can be implemented, in accordance with an embodiment of the present invention.

FIG. 3 is a block diagram of a computer system in which multiple store buffer forwarding can be implemented, in accordance with an embodiment of the present invention. In FIG. 3, the computer system 100 can include one or more processors 310(1)–310(n) coupled to a processor bus 320, which can be coupled to a system logic 330. Each of the one or more processors 310(1)–310(n) can be N-bit processors and can include one or more N-bit registers (not shown). The system logic 330 can be coupled to a system memory 340 through bus 350 and coupled to a nonvolatile memory 370 and one or more peripheral devices 380(1)–380(m) through a peripheral bus 360. The peripheral bus 360 can represent, for example, one or more Peripheral Component Interconnect (PCI) buses, PCI Special Interest Group (SIG) PCI Local Bus Specification, Revision 2.2, published Dec. 18, 1998, industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 370 may be a static memory device such as a read only memory (ROM) or a flash memory. Peripheral devices 380(1)–380(m) can include, for example, a keyboard; a mouse or other pointing devices; mass storage devices such as hard disk drives, compact disc (CD) drives, optical disks, and digital video disc (DVD) drives; displays and the like.

Load-Lock Operations (Guaranteed Forward Progress Case)

The load-lock/store-unlock sequence described above represents a general case. It is possible to conceive a scenario in which heavy snoop traffic causes the oldest load-lock operation to be continually snooped before the store-unlock can complete successfully. This scenario could result in some processes failing to make forward progress for many thousands of cycles in the face of repeated failed attempts to complete the locked-memory instruction. The following discussion describes a method that ensures that once a load-lock operation becomes the oldest memory operation it is guaranteed to make forward progress by limiting the opportunity to snoop the load-lock operation. Note that after a locked-memory instruction fails as described above in the general case, the locked-memory instruction will eventually become the oldest instruction in the machine, thus, ensuring that it immediately enters the guaranteed forward progress case described here.

When a load-lock operation that is the oldest, non-speculative load operation in the MEC and when the committed store buffer has drained, a load-lock request may be issued to the L2 cache controller which then implements this sequence of events:

1) System snoop processing is paused (using the Lock Register mechanism) while the load-lock operation checks the L2 cache for a hit on an exclusive line. This snoop processing delay step can occur earlier than in the general case.

2) If the load-lock hits an exclusive line, data can be returned to the MEC as in the general load-lock case. System snoop processing remains paused. If the load-lock fails to hit an exclusive line in the L2 cache, the L2 cache controller takes the necessary steps to acquire the line in an exclusive state. System snoop processing resumes until the system interconnect returns the cacheline in an exclusive state. At that point, system snoop processing pauses.

3) The store-unlock is processed, as it is normally, and system snoop processing can then resume.

Note that this modification ensures forward progress by relying on the system interconnect's fairness mechanism. The system must guarantee that processors requesting exclusive ownership of the same cacheline receive that ownership in a "fair" manner. Once ownership is gained using the modified load-lock sequence described above, forward progress for the oldest, non-speculative locked instruction is also guaranteed. This is deadlock-free for the same reasons that the store-unlock sequence is deadlock-free.

Multiple locked-memory instructions are similarly guaranteed to make forward progress as they each individually become the oldest memory instruction.

In accordance with embodiments of the present invention, the method can allow locked-memory instructions that operate on cacheable memory regions to execute with very nearly the same high performance that normal (non-locked) memory instructions execute. This performance can be achieved by allowing the locked-memory instructions to take full advantage of modem, super-scalar, out-of-order execution techniques. Prior implementations of locked-memory instructions forced the locked-memory instructions to execute non-speculatively and in program order. This restriction not only hindered the performance of the locked-memory instruction, but also delayed the execution of all instructions that come after the locked-memory instruction in the program flow. However, the restriction was deemed necessary to ensure that the locked memory instructions maintained their strict memory model semantics.

Embodiments of the present invention allow the locked memory-instructions and the instructions that follow the locked-memory instructions to execute out-of-order and speculatively while providing an innovative mechanism to detect when other processors are able to detect a memory model violation. Upon detection of a memory model violation, the results of speculative locked-memory instruction execution can be reversed. Since the case in which speculative execution must be reversed is rare, this invention can provide a substantial speedup in program execution when locked-memory instructions are used frequently, for example, transaction processing systems, Java, etc.

Guaranteed Forward Progress by Selectively Delaying System Snoop Traffic

This invention provides a Lock Register that is used to selectively delay system snoop traffic that may interfere with a processor's ability to successfully complete a locked-memory access. This register becomes active once all resources required to complete the locked-memory access have been acquired. This guarantees that no system deadlock will occur while greatly simplifying the processor logic associated with completing the locked-memory operation. It should be noted that, in alternate embodiments of the present invention, the technique of selectively delaying system snoop traffic also can be applied to non-locked-memory applications.

Figure 4:
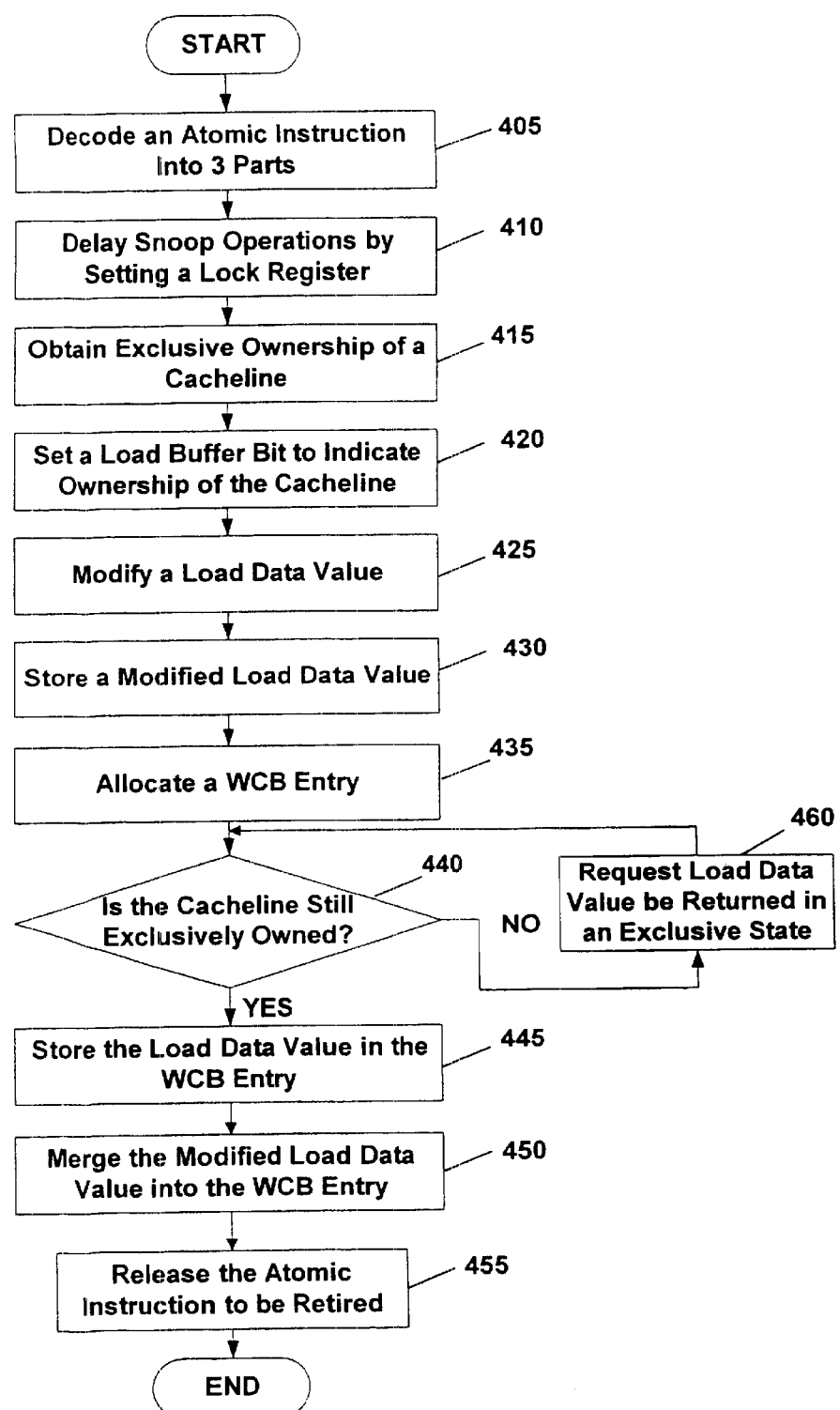
FIG. 4 illustrates a guaranteed forward progress method for executing locked-memory instructions, in accordance with an embodiment of the present invention.

FIG. 4 illustrates a guaranteed forward progress method for executing locked-memory instructions, in accordance with an embodiment of the present invention. Similar to FIG. 1, in FIG. 4, an atomic instruction can be decoded 405, generally, into three parts, a load-lock phase, a modify phase, and a store-unlock phase. In the load-lock phase, snoop operations can be delayed 410 by setting a lock register. In an embodiment of the present invention, all snoops that match the cacheline address that is the target of the store-unlock operation can be delayed. Exclusive ownership of a cacheline can be obtained 415 by making a local copy of the cacheline, which can be referred to as a load data value, to be used during the execution of the atomic instruction; and a load buffer bit, optionally, can be set 420 to indicate that the atomic instruction owns, that is, is currently in control of the cacheline. In an embodiment of the present invention, the local copy of the cacheline can be stored in the L2 cache. In addition, the bit that is set can be associated with a load buffer entry that tracks the load-lock operation that references the obtained cacheline.

In FIG. 4, in accordance with an embodiment of the present invention, in the modify phase, the local copy of the cacheline data (the load data value) can be modified 425. In general, the load data value is modified, however, it is not necessary that the load data value actually be modified. Therefore, for the sake of clarity, hereinafter the load data value resulting from the modify operation will be referred to as the "modified load data value," regardless of whether the load data value is modified or not. Similarly, the original value of the local copy of the cacheline data will continue to be referred to as the "load data value."

In FIG. 4, in the store-unlock phase, the modified load data value, regardless of whether it is modified or unmodified, can be stored 430. In an embodiment of the present invention, the modified load data value can be stored 430 in a pause queue. In addition, a WCB entry can be allocated 435. A check can be made to determine 440 if the cacheline is still exclusively owned by the atomic instruction. In an embodiment of the present invention, in which the MESI protocol is used, the cacheline will still be exclusively owned if the L2 cacheline state associated with the load buffer entry is either an "E," which indicates that the cacheline is exclusive and unmodified, or a "M," which indicates that the cacheline is modified and exclusive. If the cacheline is no longer exclusively owned, then the original value of the local copy of the cacheline data can be requested 460 to be returned in the exclusive state and the check can be redone to determine 440 if the cacheline is still exclusively owned by the atomic instruction. If the cacheline is still exclusively owned, then, the load data value can be stored 445 in, for example, the WCB entry. The modified load data value can be merged 450 with the load data value in, for example, the WCB entry. The atomic instruction can be released 455 so the instruction can be retired and committed to the architectural state.

In accordance with an embodiment of the present invention, the system and method can be used in high-performance single processor and multi-processor systems. The invention can be of value to users whose software frequently executes locked-memory instructions. For example, users in the market segment that runs transaction processing systems with multiple processors, and in market segments that rely on systems for transaction processing solutions. However, the value of this invention is not limited to just large systems, for example, an embodiment of the present invention can be used with applications that can make use of locked-memory instructions even though those applications do not require the locked-memory semantics. Some instructions, such as XCHG (Exchange), which requires a lot of processing overhead to be executed, have implicit locked-memory semantics, however, for example, some compilers use the XCHG instruction in situations where the locked-memory semantics are not required. This is unfortunate since processor performance can be significantly reduced when such instructions are used frequently and unnecessarily. Embodiments of the present invention, therefore, can provide value, to even single-processor systems running ordinary (that is, non-server) applications.

In accordance with an embodiment of the present invention, a method for executing locked-memory instructions includes decoding a locked-memory instruction, obtaining exclusive ownership of a cacheline to be used by a load-lock operation, setting a bit to indicate the load-lock operation's ownership of the cacheline, and activating a snoop checking process. The method also includes modifying a load data value and storing the modified load data value. The method further includes determining that the cacheline is still exclusively owned, storing the load data value, determining that the cacheline is unsnooped, merging the modified load data value with the load data value, and releasing the locked-memory instruction to be retired.

In accordance with an embodiment the present invention, a machine-readable medium having stored thereon a plurality of executable instructions for executing locked-memory instructions, the plurality of instructions include instructions to decode a locked-memory instruction, obtain exclusive ownership of a cacheline to be used by a load-lock operation, and set a bit to indicate the load-lock operation's ownership of the cacheline. The method also includes instructions to modify a load data value and store the modified load data value. The method further includes instructions to determine that the cacheline is still exclusively owned, store the load data value, determine that the cacheline is unsnooped, merge the modified load data value with the load data value, and release the locked-memory instruction to be retired.

In accordance with an embodiment the present invention, a processor includes a second-level data cache, a multiplexer coupled to the second-level cache, a load buffer coupled to the multiplexer, a load buffer comparator coupled to the load buffer, a control logic component coupled to the load buffer, a store buffer, a pause queue coupled to the store buffer, a write combining buffer coupled to the pause queue, the write combining buffer further coupled to the multiplexer, and the write combining buffer being further coupled to the second-level data cache, a lock register coupled to the pause queue, and a lock register comparator coupled to the lock register and coupled to the load buffer comparator.

In accordance with an embodiment of the present invention, a method for executing locked-memory instructions includes decoding a locked-memory instruction, obtaining exclusive ownership of a cacheline to be used by a load-lock operation, and setting a bit to indicate the load-lock operation's ownership of the cacheline. The method also includes modifying a load data value and storing the modified load data value. The method further includes determining that the cacheline is still exclusively owned, storing the load data value, merging the modified load data value with the load data value, and releasing the locked-memory instruction to be retired.

It should, of course, be understood that while the present invention has been described mainly in terms of microprocessor- and multi-processor-based personal computer systems, those skilled in the art will recognize that the principles of the invention may be used advantageously with alternative embodiments involving other integrated processor chips and computer systems. For example, in alternative embodiments of the present invention, the method and system can be advantageously used with multi-threaded processing on a single processor system. Accordingly, all such implementations which fall within the spirit and scope of the appended claims will be embraced by the principles of the present invention.

What is claimed is:

1. A method for executing a locked-memory instruction, the method comprising:

obtaining exclusive ownership of a cacheline for a load-lock operation;

setting a bit to indicate the load-lock operation's ownership of the cacheline;

storing a modified version of a load data value;

determining that the cacheline is still exclusively owned;

storing the load data value;

determining that the cacheline is unsnooped;

merging the modified version of the load data value with the stored load data value; and releasing the locked-memory instruction to be retired.

2. The method of claim 1 further comprising:

decoding the locked-memory instruction; and breaking the locked-memory instruction into the load-lock operation, a modify operation, and a store-unlock operation.

3. The method of claim 1 further comprising:

allocating a write combining buffer entry; and setting a lock register by storing an address in the lock register of a store-unlock operation that reserved the write combining buffer entry.

4. The method of claim 3 further comprising:

delaying a snoop checking process during a critical sequence in the execution of the locked-memory instruction.

5. The method of claim 4 wherein said delaying the snoop checking process during a critical sequence in the execution of the locked-memory instruction comprises:

delaying the snoop checking process while
   allocating the write combining buffer entry in an exclusive state, checking to determine whether a snoop of the executing instruction occurred, and updating the write combining buffer entry with the stored load data value, if said snoop of the executing instruction occurred.

6. The method of claim 1 further comprising:

requesting the load data value be returned in an exclusive state, if the cacheline is in a non-exclusive state; and determining that the cacheline is still exclusively owned.

7. The method of claim 1 further comprising:

flushing the locked-memory instruction and all younger dependent instructions, if the cacheline has been snooped; and restarting the method by re-executing said obtaining exclusive ownership of the cacheline for the load-lock operation.

8. A machine-readable medium having stored thereon a locked-memory instruction, said locked memory instruction executable to perform a method comprising:

obtaining exclusive ownership of a cacheline for a load-lock operation;

setting a bit to indicate the load-lock operation's ownership of the cacheline;

storing a modified version of a load data value;

determining that the cacheline is still exclusively owned;

storing the load data value;

determining that the cacheline is unsnooped;

merging the modified version of the load data value with the stored load data value; and releasing the locked-memory instruction to be retired.

9. The machine-readable medium of claim 8, said method further comprising:

decoding the locked-memory instruction; and breaking the locked-memory instruction into the load-lock operation, a modify operation, and a store-unlock operation.

10. The machine-readable medium of claim 8, said method further comprising:

allocating a write combining buffer entry; and setting a lock register by storing an address in the lock register of a store-unlock operation that reserved the write combining buffer entry.

11. The machine-readable medium of claim 10, said method further comprising:

delaying a snoop checking process during a critical sequence in the execution of the locked-memory instruction.

12. The machine-readable medium of claim 11 wherein said delaying the snoop checking process during a critical sequence in the execution of the locked-memory instruction comprises:

delaying the snoop checking process while allocating the write combining buffer entry in an exclusive state, checking to determine whether a snoop of the executing instruction occurred, and updating the write combining buffer entry with the stored load data value, if said snoop of the executing instruction occurred.

13. The machine-readable medium of claim 8, said method further comprising:

requesting the load data value be returned in an exclusive state, if the cacheline is in a non-exclusive state; and determining that the cacheline is still exclusively owned.

14. The machine-readable medium of claim 8, said method further comprising:

flushing the locked-memory instruction and all younger dependent instructions, if the cacheline has been snooped; and restarting the method by re-executing said obtaining exclusive ownership of the cacheline for the load-lock operation.

15. A processor comprising:

a first cache;

a load buffer coupled to the first cache;

a control logic component coupled to the load buffer;

a store buffer;

a pause queue coupled to the store buffer;

a write combining buffer coupled to the pause queue and the first cache; and a lock register coupled to the pause queue and the load buffer.

16. The processor of claim 15 further comprising:

a second cache coupled to the first cache.

17. The processor of claim 15 wherein said processor is implemented as a plurality of processors in a multi-processor system such that each of said plurality of processors includes a separate set of hardware resources.

18. A processor comprising:

a first cache to store a local copy of a cacheline and to maintain exclusivity information associated with the local copy of the cacheline for use by a locked-memory instruction;

a load buffer coupled to the first cache, the load buffer to receive and queue a load-lock operation and an associated load data value;

a control logic component coupled to the load buffer, the control logic component to control retirement of the locked-memory instruction;

a store buffer to receive and queue a store-unlock operation and the load data value;

a pause queue coupled to the store buffer, the pause queue to store a modified version of the load data value and execute a store-unlock operation received from the store buffer;

a lock register coupled to the pause queue and the load buffer, the lock register to receive and store an address of the store-unlock operation; and a write combining buffer coupled to the pause queue and the first cache, the write combining buffer to receive the modified version of the load data value from the pause queue and merge the modified version of the load data value with the load data value.

19. The processor of claim 18 further comprising:

a second cache coupled to the first cache to store an original version of the cacheline.

20. The processor of claim 18 wherein said processor is implemented as a plurality of processors in a multi-processor system such that each of said plurality of processors includes a separate set of hardware resources.

* * * * *